United States Patent
Jensen et al.

(10) Patent No.: US 6,528,448 B1
(45) Date of Patent: Mar. 4, 2003

(54) POLYMERIZATION CATALYST COMPOSITIONS AND PROCESSES TO PRODUCE POLYMERS AND BIMODAL POLYMERS

(75) Inventors: Michael D. Jensen, Bartlesville, OK (US); Max P. McDaniel, Bartlesville, OK (US); Elizabeth A. Benham, Bartlesville, OK (US); Anthony P. Eaton, Dewey, OK (US); Joel L. Martin, Bartlesville, OK (US); Gil R. Hawley, Dewey, OK (US); Tony R. Crain, Niotaze, KS (US); Martha J. Tanner, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/561,306

(22) Filed: Apr. 28, 2000

(51) Int. Cl.$^7$ .................................. C08F 4/64
(52) U.S. Cl. .................. 502/132; 502/104; 502/110; 502/120; 502/114; 526/133; 526/160; 526/165
(58) Field of Search .................. 526/160, 165, 526/133; 502/104, 152, 110, 114, 120, 129, 132

(56) References Cited

U.S. PATENT DOCUMENTS

| | | | | |
|---|---|---|---|---|
| 4,871,705 A | * | 10/1989 | Hoel | 502/117 |
| 4,939,217 A | | 7/1990 | Stickler | 526/114 |
| 5,332,706 A | | 7/1994 | Nowlin et al. | 502/107 |
| 5,539,076 A | | 7/1996 | Nowlin et al. | 526/348.1 |
| 5,747,405 A | | 5/1998 | Little et al. | 502/113 |
| 6,107,230 A | * | 8/2000 | McDaniel et al. | 502/104 |
| 6,242,622 B1 | * | 6/2001 | Oda et al. | 556/11 |

OTHER PUBLICATIONS

Thorimbert, S. et al., "Setective Heterogenous Epoxidations with Cp–Titanium Chloride Derived Microporous Silica Glasses", *Tetrahedron*, 1995, 51(3), 3787–3792.

Corradini, P. & Allegra, "Colinear Bonds At The Oxygen Atom", G., J. Am. Chem. Soc., 1959, 81, 5510–5511.

Gorsich, R. D., "Preparation and Properties of cyclopentadienyl titanium Trichloride", J. Am. Chem. Soc., 1960, 82, 4211–4215.

* cited by examiner

*Primary Examiner*—Caixia Lu
(74) *Attorney, Agent, or Firm*—Kilpatrick Stockton LLP

(57) ABSTRACT

A process to produce a first catalyst composition is provided. The process comprises contacting at least one first organometal compound, oxygen bridged mono-cyclopentadienyl transition metal dimer, and at least one activator to produce the first catalyst composition. The activator is selected from the group consisting of aluminoxanes, fluoro-organo borates, and treated solid oxide components in combination with at least one organoaluminum compound. In another embodiment of this invention, a process to produce a second catalyst composition for producing bimodal polymers is provided. The process comprises contacting at least one first organometal compound, at least one activator, and at least one second organometal compound to produce the second catalyst composition. The first and second catalyst compositions are also provided as well as polymerization processes using these compositions to produce polymers.

3 Claims, 1 Drawing Sheet

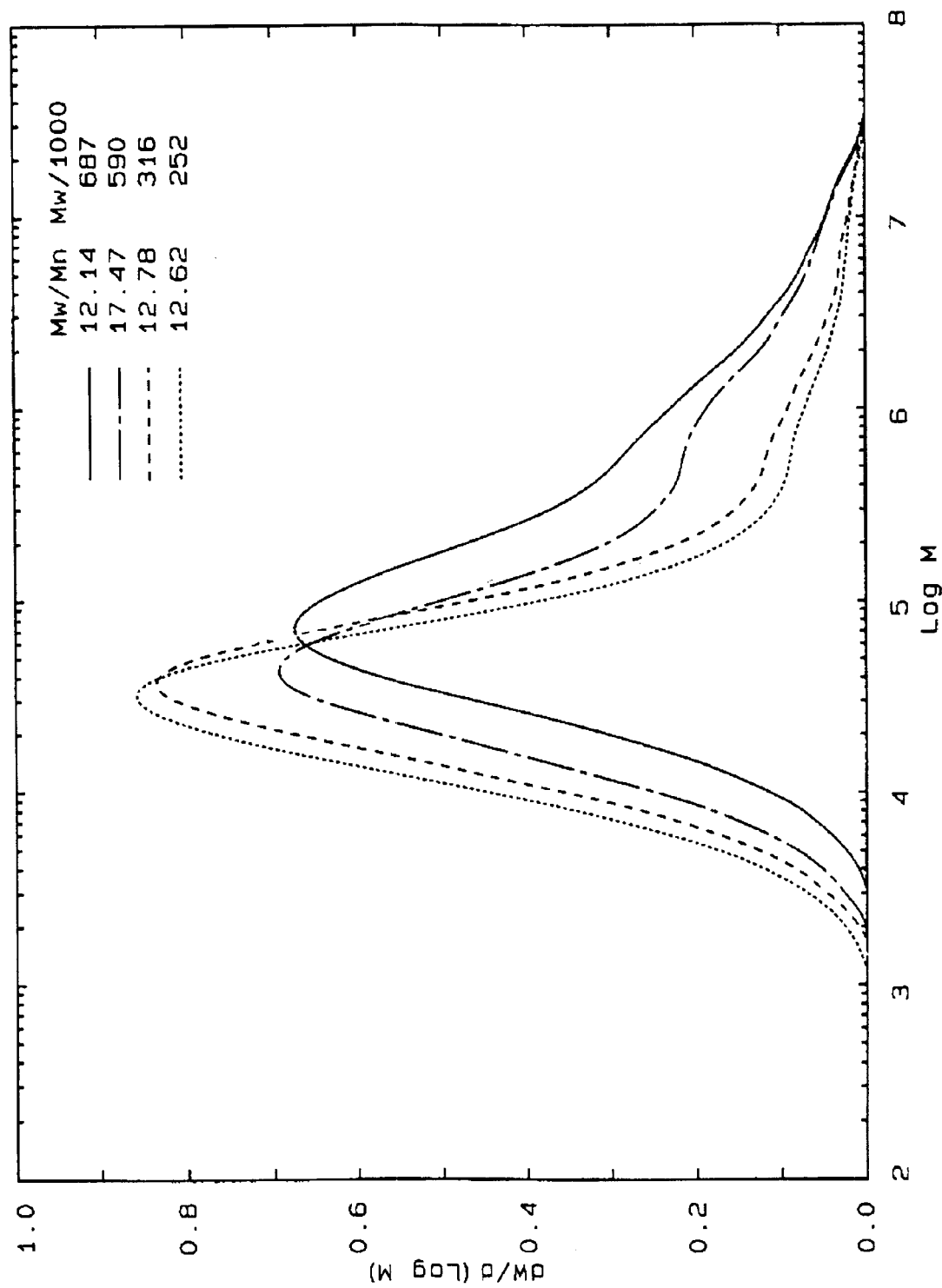

POLYMERIZATION CATALYST COMPOSITIONS AND PROCESSES TO PRODUCE POLYMERS AND BIMODAL POLYMERS

FIELD OF THE INVENTION

This invention is related to the field of polymerization catalyst compositions.

BACKGROUND OF THE INVENTION

Zirconium based metallocene polymerization catalysts, such as, bis(cyclopentadienyl)zirconium dichloride, are well known and are commonly used as ethylene polymerization catalysts when combined with activators, such as, for example, methylaluminoxane (MAO). A description of such catalysts can be found, for example, in Angew. Chem. 88, 689, 1976, Justus Liebigs Ann. Chem. 1975, 463, and U.S. Pat. No. 5,324,800, herein incorporated by reference. Zirconium based metallocenes can be quite active, but unfortunately, these metallocenes also produce a fairly narrow molecular weight distribution.

For many extrusion grade applications, such as film, pipe, and blow molding, polymers having broad molecular weight distributions are preferred. Especially preferred are so-called "bimodal distribution" polymers because of the superior toughness imparted to the final manufactured resin part. See, for example, U.S. Pat. No. 5,306,775 and U.S. Pat. No. 5,319,029, herein incorporated by reference. The superior toughness can result from concentrating the short chain branching in the high molecular weight portion of the molecular weight distribution. Extremely long and highly branched chains can be more effective as tie molecules between the crystalline phases. These tie molecules can impart higher impact resistance and environmental stress crack resistance to bimodal polymers.

To produce such bimodal polymers from metallocene catalysts, it is necessary to combine two metallocenes. A first metallocene is utilized to produce a low molecular weight polymer having little branching. Zirconium based metallocenes can function well in such a role. A second metallocene is utilized to produce the high molecular weight polymer, and this second metallocene should also simultaneously incorporate comonomers, such as hexene, very well. In this way, the longest chains contain the most branching, which is ideal for the production of bimodal polymers.

Unfortunately, the requirements of the second metallocene has been difficult to fill. Of the zirconium based metallocenes described previously, few generate very high molecular weight polymer. Of these few, activity or stability is often poor, and comonomer incorporation is not impressive. A second class of metallocene catalysts, called half-sandwich titanium based metallocenes, do produce very high molecular weight polymer, and some even incorporate hexene well. See Organometallics, 1966, 15, 693–703 and Macromolecules 1998, 31, 7588–7597. Half-sandwich titanium based metallocenes have a titanium bonded to one cyclopentadienyl, indenyl, or fluorenyl group. However, these compounds are not noted for their high activity.

There is a need in the polymer industry for a metallocene catalyst or organometal catalyst that produces high molecular weight polymer, has a high activity, and incorporates comonomers efficiently that can be used alone or in combination with other metallocenes.

It is an object of this invention to provide a first organometal compound capable of producing high molecular weight polymers.

It is another object of this invention to provide a process for producing a first catalyst composition. The process comprises contacting at least one first organometal compound and at least one activator.

It is another object of this invention to provide the first catalyst composition.

It is another object of this invention to provide a polymerization process. The process comprises contacting the first catalyst composition with one or more alpha olefins in a polymerization zone under polymerization conditions to produce a high molecular weight polymer.

It is another object of this invention to provide the high molecular weight polymer.

It is another object of this invention to provide a process for producing a second catalyst composition capable of producing bimodal polymers. The process comprises contacting the first organometal compound, at least one activator, and at least one second organometal compound.

It is another object of this invention to provide the second catalyst composition capable of producing bimodal polymers.

It is a further object of this invention to provide a process for the production of bimodal polymers. The process comprises contacting the second catalyst composition with one or more alpha olefins in a polymerization zone under polymerization conditions to produce the bimodal polymers.

It is yet a further object of this invention to provide the bimodal polymer.

SUMMARY OF THE INVENTION

According to one embodiment of this invention, a process to produce a first catalyst composition is provided. The process comprises contacting at least one first organometal compound and at least one activator to produce the first catalyst composition;

wherein the first organometal compound is represented by the formula

wherein $M^1$ is selected from the group consisting of titanium, zirconium, and hafnium;

wherein $M^2$ is selected from the group consisting of a transition metal, a lanthanide metal, an actinide metal, a Group IIIB metal, a Group IVB metal, a Group VB metal, and a Group VIB metal;

wherein Cp is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of Cp are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein R is independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and wherein the activator is selected from the group consisting of aluminoxanes, fluoro-organo borates, and treated solid oxide components in combination with at least one organoaluminum compound.

In another embodiment of this invention, a process to produce a second catalyst composition for producing bimodal polymers is provided. The process comprises contacting at least one first organometal compound, at least one activator, and at least one second organometal compound to produce the second catalyst composition;

wherein the second organometal compound is represented by the formula, $(C_5R_5)_2ZrX_2$;

wherein the R is the same or different and is independently selected from the group consisting of hydrogen and a hydrocarbyl group having from 1 to about 10 carbon atoms;

wherein the hydrocarbyl group is selected from the group consisting of a linear or branched alkyl, a substituted or unsubstituted aryl, and an alkylaryl; and wherein X is the same or different and is independently selected from the group consisting of a halide, an alkyl, an alkylaryl having from 1 to about 10 carbon atoms, and a triflate.

BRIEF DESCRIPTION OF DRAWING

FIG. 1 is a graph showing the polymer molecular weight distribution (MWD). The normalized weight fraction per increment of log M [dW/d(log M)] is plotted as a function of the molecular weight (M) in grams per mole (g/mol), plotted on a logarithmic (log) scale.

DETAILED DESCRIPTION OF THE INVENTION

In a first embodiment of this invention, a process to produce a first catalyst composition is provided. The process comprises contacting at least one first organometal compound and at least one activator. The first organometal compound is represented by the formula:

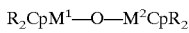

In this formula, $M^1$ is selected from the group consisting of titanium, zirconium, and hafnium. Currently, it is preferred when Ml is titanium. $M^2$ is selected from the group consisting of a transition metal, a lanthanide, an actinide, a Group IIIB metal, a Group IVB metal, a Group VB metal, and a Group VIB metal. Preferably, $M^2$ is titanium.

In this formula, Cp is independently selected from the group consisting of cyclopentadienyls, indenyls, fluorenyls, substituted cyclopentadienyls, substituted indenyls, such as, for example tetrahydroindenyls, and substituted fluorenyls, such as, for example, octahydrofluorenyls.

Substituents on the substituted cyclopentadienyls, substituted indenyls, and substituted fluorenyls of Cp are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the first organometal compound.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, R is independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups.

Preferably, the first organometal compound can be represented by the following formula:

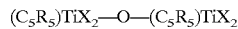

In this formula, each R is the same or different and is independently selected from the group consisting of hydrogen and a hydrocarbyl group having from 1 to about 10 carbon atoms. The hydrocarbyl group is selected from the group consisting of a linear or branched alkyl, a substituted or unsubstituted aryl, and an alkylaryl. X is the same or different and is independently selected from the group consisting of a halide, an alkyl, an alkylaryl having from 1 to about 10 carbon atoms, and a triflate. Suitable first organometal compounds include, for example, $[(C_5H_4CH_3)TiCl_2]_2O$, $[(C_5H_4CH_2C_6H_5)TiF_2]_2O$, $[(C_5H_3CH_3C_2H_5)TiBr_2]O$, and $[(C_5H_5)TiCl_2]_2O$. Most preferably, the first organometal compound is $[(C_5H_5)TiCl_2]_2O$. Combinations of these first organometal compounds also can be used.

The activator is selected from the group consisting of aluminoxanes, fluoro-organo borates, and at least one treated solid oxide component in combination with at least one organoaluminum compound.

Aluminoxanes, also referred to as poly(hydrocarbyl aluminum oxides), are well known in the art and are generally prepared by reacting an hydrocarbylaluminum compound with water. Such preparation techniques are disclosed in U.S. Pat. Nos. 3,242,099 and 4,808,561, the entire disclosures of which are herein incorporated by reference. The currently preferred aluminoxanes are prepared from trimethylaluminum or triethylaluminum and are sometimes referred to as poly(methyl aluminum oxide) and poly(ethyl aluminum oxide), respectively. It is also within the scope of the invention to use an aluminoxane in combination with a trialkylaluminum, such as disclosed in U.S. Pat. No. 4,794,096, the disclosure of which is herein incorporated by reference.

Generally, any amount of the aluminoxane capable of activating the first organometal compound is utilized in this invention. Preferably, the molar ratio of the aluminum in the aluminoxane to the transition metal in the metallocene is in a range of about 1:1 to about 100,000:1, and, most preferably, 5:1 to 15,000:1. Generally, the amount of aluminoxane added to a polymerization zone is an amount within a range of about 0.01 mg/L to about 1000 mg/L, preferably about 0.1 mg/L to about 100 mg/L. Most preferably, the amount of aluminoxane added is an amount within a range of 1 to 50 mg/L in order to maximize catalyst productivity and activity.

Fluoro-organo borate compounds also can be used to activate and form the first catalyst composition. Any fluoro-organo borate compound known in the art that is capable of activating an organometal compound can be utilized. Examples of such fluoro-organo borate compounds include, but are not limited to, fluorinated aryl borates, such as, N,N-dimethylanilinium tetrakis(pentafluorophenyl)borate, triphenylcarbenium tetrakis(pentafluorophenyl)borate, lithium tetrakis(pentafluorophenyl)borate, tris (pentafluorophenyl)boron, N,N-dimethylanilinium tetrakis [3,5-bis(trifluoromethyl)phenyl]borate, triphenylcarbenium tetrakis[3,5-bis(trifluoromethyl)phenyl]borate, and mixtures thereof. Although not intending to be bound by theory, these examples of fluoro-organo borate compounds and related fluoro-organo borates are thought to form "weakly-coordinating" anions when combined with organometal compounds as disclosed in U.S. Pat. No. 5,919,983, herein incorporated by reference.

Generally, any amount of fluoro-organo borate compound capable of activating the organometal compound is utilized in this invention. Preferably, the amount of the fluoro-organo borate compound is in a range of from about 0.5 mole to about 10 moles of fluoro-organo borate compound per mole of organometal compound. Most preferably, the amount of the fluoro-organo borate compound is in a range of from 0.8 mole to 5 moles of fluoro-organo borate compound per mole of organometal compound.

The aluminoxane and fluoro-organo borate compounds can be supported or unsupported. If supported, generally the support is an inorganic oxide, such as, silica, an aluminate, or combinations thereof. The use of a supported activator can result in a heterogeneous catalyst composition, and an unsupported activator can result in a homogeneous catalyst composition.

Preferably, the activator is a treated solid oxide component used in combination with an organoaluminum compound. The treated solid oxide component is a halided solid oxide component or a halided, metal-containing solid oxide component. The halided solid oxide component comprises a halogen and a solid oxide component. The halided, metal-containing solid oxide component comprises a halogen, a metal, and a solid oxide component.

The organoaluminum compound can be represented by the following formula:

In this formula, R is the same or different and is selected from the group consisting of hydride and a hydrocarbyl group having 1 to about 10 carbon atoms. The hydrocarbyl group is selected from the group consisting of a linear or branched alkyl, a substituted or unsubstituted aryl and an alkylaryl. X is selected from the group consisting of halides and hydrocarbyloxides. The hydrocarbyloxide is selected from the group consisting of a linear or branched alkoxide, a substituted or unsubstituted aryloxide and an alkylaryloxide. The number n is either 1 or 0. Suitable organoaluminum compounds include, for example, triisobutylaluminum, diethylaluminum hydride, dipentylaluminum ethoxide, dipropylaluminum phenoxide, and the mixtures thereof. Preferably, the organoaluminum compound is trialkylaluminum. Most preferably, it is triisobutylaluminum or triethylaluminum. Combinations of these organoaluminum compounds also can be used.

The solid oxide component is prepared from an aluminate selected from the group consisting of alumina, silica-alumina, aluminophosphate, aluminoborate, and mixtures thereof. Preferably, the solid oxide component is alumina. The halogen is selected from the group consisting of chlorine and bromine. Preferably, for highest activity, the halogen is chlorine. The metal is selected from the group consisting of zinc, nickel, vanadium, silver, copper, gallium, tin, tungsten, and molybdenum. Preferably, for high activity and low cost, the metal is zinc.

The solid oxide component has a pore volume greater than about 0.5 cc/g, preferably, greater than about 0.8 cc/g, and most preferably, greater than 1.0 cc/g. The solid oxide component has a surface area in a range of about 100 to about 1000 m$^2$/g, preferably from about 200 to about 800 m$^2$/g, and most preferably, from 250 to 600 m$^2$/g.

To produce the halided solid oxide component, the solid oxide component is calcined either prior to, during, or after contacting with a halogen-containing compound. Generally, calcining is conducted for about 1 minute to about 100 hours, preferably for about 1 hour to about 50 hours, and most preferably, from 3 hours to 20 hours. The calcining is conducted at a temperature in a range of about 200 to about 900° C., preferably, in a range of about 300 to about 800° C., and most preferably, in a range of 400 to 700° C. Any type of suitable ambient can be used during calcining. Generally, calcining can be completed in an inert atmosphere. Alternatively, an oxidizing atmosphere, such as, for example, oxygen or air, or a reducing atmosphere, such as, for example, hydrogen or carbon monoxide, can be used.

The halogen-containing compound is at least one compound selected from the group consisting of chlorine-containing compounds and bromine-containing compounds. The halogen-containing compound can be in a liquid or preferably, a vapor phase. The solid oxide component can be contacted with the halogen-containing compound by any means known in the art. Preferably, the halogen-containing compound can be vaporized into a gas stream used to fluidize the solid oxide component during calcining. The solid oxide component is contacted with the halogen-containing compound generally from about 1 minute to about 10 hours, preferably, from about 5 minutes to about 2 hours, and most preferably, from 10 minutes to 30 minutes. Generally, the solid oxide component is in contact with the halogen-containing compound at a temperature in the range of about 200 to about 900° C., preferably, at a temperature in a range of about 300 to about 800° C., and most preferably, in a range of 400 to 700° C. Any type of suitable ambient can be used to contact the solid oxide component and the halogen-containing compound. Preferably, an inert atmosphere is used. Alternatively, an oxidizing or reducing atmosphere can also be used.

Suitable halogen-containing compounds include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof. Additionally, chlorine and bromine gas can be used. Optionally, a fluorine-containing compound or fluorine gas can also be included when contacting the solid oxide component with the halogen-containing compound to achieve higher activity in some cases.

The amount of halogen present in the halided solid oxide component is generally in the range of about 2 to about 150% by weight, preferably about 10% to about 100% by weight, and most preferably, 15% to 75% by weight, where the weight percents are based on the weight of the halided solid oxide component before calcining or the amount added to a precalcined solid oxide component.

To produce the halided, metal-containing solid oxide component, the solid oxide component first is treated with a metal-containing compound The metal-containing compound can be added to the solid oxide component by any method known in the art. In a first method, the metal can be added to the solid oxide component by cogellation of aqueous materials, as disclosed in U.S. Pat. Nos. 3,887,494; 3,119,569; 4,405,501; 4,436,882; 4,436,883; 4,392,990; 4,081,407; 4,981,831; and 4,152,503; the entire disclosures of which are hereby incorporated by reference.

In a second method, the metal-containing compound can be added to the solid oxide component by cogellation in an organic or anhydrous solution as disclosed in U.S. Pat. Nos. 4,301,034; 4,547,557; and 4,339,559; the entire disclosures of which are hereby incorporated by reference.

The preferred method is to impregnate the solid oxide component with an aqueous or organic solution of a metal-containing compound prior to calcining to produce a metal-containing solid oxide component. A suitable amount of the solution is utilized to provide the desired concentration of metal after drying. The metal-containing solid oxide component then is dried by any suitable method known in the art. For example, the drying can be accomplished by vacuum drying, spray drying, or flash drying.

Any metal-containing compound known in the art that can impregnate the solid oxide component with the desired metal can be used in this invention. The metal-containing compound can be any water soluble salt, such as, for example, nickel nitrate, zinc chloride, copper sulfate, silver acetate, or vanadyl sulfate. The metal-containing compound can also be an organometallic compound, such as, for example, nickel acetylacetonate, vanadium ethylhexanoate, zinc naphthenate, and mixtures thereof.

Generally, the amount of metal present is in the range of about 0.1 to about 10 millimoles per gram of solid oxide component before calcining. Preferably, the amount of metal present is in the range of about 0.5 to about 5 millimoles per gram of solid oxide component before calcining. Most preferably, the amount of metal present is in the range of 1 to 3 millimoles per gram of solid oxide component before calcining.

After the solid oxide component is combined with the metal-containing compound to produce a metal-containing solid oxide component, it then is calcined for about 1 minute to about 100 hours, preferably for about 1 hour to about 50 hours, and most preferably, from 3 hours to 20 hours. The calcining is conducted at a temperature in a range of about 200 to about 900° C., preferably, in a range of about 300 to about 800° C., and most preferably, in a range of 400 to 700° C. Any type of suitable ambient can be used during calcining. Generally, calcining can be completed in an inert atmosphere. Alternatively, an oxidizing atmosphere, such as, for example, oxygen or air, or a reducing atmosphere, such as, for example, hydrogen or carbon monoxide, can be used.

After or during calcining, the metal-containing solid oxide component is contacted with a halogen-containing compound to produce the halided, metal-containing solid oxide component. Methods for contacting the metal-containing solid oxide component with the halogen-containing compound are the same as discussed previously for the halided solid oxide component.

Optionally, the metal containing solid oxide component also can be treated with a fluorine-containing compound before, during, or after contacting the halogen-containing compound, which can further increase the activity. Any fluorine-containing compound capable of contacting the solid oxide component during the calcining step can be used. Organic fluorine-containing compounds of high volatility are especially useful. Such organic fluorine-containing compounds can be selected from the group consisting of freons, perfluorohexane, perfluorobenzene, fluoromethane, trifluoroethanol, and mixtures thereof. Gaseous hydrogen fluoride or fluorine itself can be used. One convenient method of contacting the solid oxide component is to vaporize a fluorine-containing compound into a gas stream used to fluidize the solid oxide component during calcination.

In a preferred first embodiment, a process to produce a first catalyst composition is provided. The process comprises contacting, bis(cyclopentadienyl titanium dichloride) oxide, $(CpTiCl_2)_2O$, a chlorided, zinc-containing alumina, and an organoaluminum compound selected from the group consisting of triisobutyl aluminum and triethylaluminum to produce the first catalyst composition. The amount of zinc present is in the range of about 0.5 millimoles to about 5 millimoles of zinc per gram of alumina. The chloriding treatment consists of exposure to a volatile chlorine-containing compound at about 500 to about 700° C.

The catalyst compositions of this invention can be produced by contacting the first organometal compound and the activator together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor.

Currently, one method is to first contact a first organometal compound and the treated solid oxide component together, for about 1 minute to about 24 hours, preferably, about 1 minute to about 1 hour, at a temperature from about 10° C. to about 100° C., preferably 15° C. to 50° C., to form a first mixture, and then contact this first mixture with an organoaluminum compound to form the first catalyst composition.

Another method is to precontact the first organometal compound, the organoaluminum compound, and the treated solid oxide component before injection into a polymerization reactor for about 1 minute to about 24 hours, preferably, 1 minute to 1 hour, at a temperature from about 10° C. to about 200° C., preferably 20° C. to 80° C. to produce the first catalyst composition.

A weight ratio of the organoaluminum compound to the treated solid oxide component in the first catalyst composition ranges from about 5:1 to about 1:1000, preferably, from about 3:1 to about 1:100, and most preferably, from 1:1 to 1:50.

A weight ratio of the treated solid oxide component to the first organometal compound in the first catalyst composition ranges from about 10,000:1 to about 1:1, preferably, from about 1000:1 to about 10:1, and most preferably, from 250:1 to 20:1. These ratios are based on the amount of the components combined to give the first catalyst composition.

When the treated solid oxide component is utilized, after contacting the compounds, the first catalyst composition comprises a post-contacted first organometal compound, a post-contacted organoaluminum compound, and a post-contacted treated solid oxide component. It should be noted that the post-contacted solid oxide component is the majority, by weight, of the first catalyst composition. Often times, specific components of a catalyst are not known, therefore, for this invention, the first catalyst composition is described as comprising post-contacted compounds.

A weight ratio of the post-contacted organoaluminum compound to the post-contacted treated solid oxide component in the first catalyst composition ranges from about 5:1 to about 1:1000, preferably, from about 3:1 to about 1:100, and most preferably, from 1:1 to 1:50.

A weight ratio of the post-contacted treated solid oxide component to the post-contacted first organometal compound in the first catalyst composition ranges from about 10,000:1 to about 1:1, preferably, from about 1000:1 to about 10:1, and most preferably, from 250:1 to 20:1.

When comparing activities, the polymerization runs should occur at the same polymerization conditions. It is preferred if the activity of the first catalyst composition is greater than about 1000 grams of polymer per gram of activator per hour, more preferably greater than about 2000, and most preferably greater than 3000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the first catalyst composition. Aluminoxane is an expensive compound that greatly increases polymer production costs. This also means that no water is needed to help form such aluminoxanes. This is beneficial because water can sometimes kill a polymerization process. It should be noted that no fluorophenyl borate or other fluoro-organo boron compounds need to be used in order to form the first catalyst composition. Additionally, no organochromium compounds or MgCl$_2$ need to be added to form the invention. Although aluminoxane, fluoro-organo boron compounds, organochromium compounds, or MgCl$_2$ are not needed in the preferred embodiments, these compounds can be used in other embodiments of this invention.

In a second embodiment of this invention, a process comprising contacting at least one monomer and the first catalyst composition to produce at least one polymer is provided. The term "polymer" as used in this disclosure includes homopolymers and copolymers. The first catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The first catalyst composition used in this process produce good quality polymer particles without substantially fouling the reactor. When the first catalyst composition is to be used in a loop reactor zone under slurry polymerization conditions, it is preferred when the particle size of the treated solid oxide component is in the range of about 10 to about 1000 microns, preferably about 25 to about 500 microns, and most preferably, 50 to 200 microns, for best control during polymerization.

One novelty of this invention is that butene can be formed during ethylene polymerization. The butene then is copolymerized by the organometal compound to yield ethylene-butene copolymers even though no butene is fed to the reactor. Thus, the polymers produced from the inventive catalyst composition can contain up to about 1 weight percent ethyl branching even though no butene is fed to the reactor.

In a third embodiment of this invention, a process is provided wherein the first catalyst composition is further contacted with at least one second organometal compound to produce a second catalyst composition capable of producing bimodal polymers. The second organometal compound can be represented by the following formula:

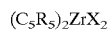

In this formula, each R is the same or different and is selected from the group consisting of hydrogen and a hydrocarbyl group having from 1 to about 10 carbon atoms.

The hydrocarbyl group is selected from the group consisting of a linear or branched alkyl, a substituted or unsubstituted aryl, and an alkylaryl. X is the same or different and is independently selected from the group consisting of a halide, an alkyl, an alkylaryl having from 1 to about 10 carbon atoms, and a triflate. Suitable organometallic compounds include, for example, $(C_5H_4CH_3)_2ZrCl_2$, $(C_5H_4CH_2C_6H_6)_2ZrF_2$, $(C_5H_4C_4H_9)_2ZrCl_2$, and $(C_5H_3CH_3C_2H_5)_2ZrBr_2$. Preferably the organometallic compound is $(C_5H_4C_4H_9)_2ZrCl_2$. Combinations of these organometal compounds can also be used.

The type and amount of the activator in the second catalyst composition is the same as discussed previously for the first catalyst composition. Generally, the amount of the first organometal compound and the second organometal compound combined in the second catalyst composition is the same as the amount of the first organometal in the first catalyst composition. The ratio of the first organometal compound to the second organometal compound ranges from about 1:100 to about 100:1.

The second organometal compound can be contacted with the other ingredients of this catalyst by any method which was suitable for the first organometal compound. For example, it can be mixed with the first organometal compound in a hydrocarbon solution and pumped into the reactor separately. Or, the second organometal compound can be fed into a precontacting vessel where all or some of the other ingredients may be contacted before being introduced into the reactor. Alternatively, all of the ingredients can be fed individually into the reactor directly.

Preferably, the activity of the second catalyst composition is similar to that for the first catalyst composition. In addition, aluminoxanes, fluoro-organo boron compounds, organochromium compounds, and $MgCl_2$ are not required to produce the second catalyst composition, therefore providing the same benefits as previously discussed for the first catalyst composition.

The second catalyst composition can be used in the polymerization processes as discussed previously for the first catalyst composition. When making bimodal polymers according to this third embodiment, it is preferred to add comonomer and hydrogen in the polymerization reaction zone. Hydrogen can be used to control molecular weight, and comonomer can be used to control polymer density.

EXAMPLES

Preparation of $(CpTiCl_2)_2O$:

Under a dry nitrogen atmosphere, 600 mL of dry tetrahydrofuran (THF) were added to a flask containing 64.70 grams of cyclopentadienyl titanium trichloride obtained from the Strem Company to produce a mixture. The mixture formed a first solution as the orange solid dissolved in the THF. Then, a second solution containing 200 mL of THF and 5.309 grams of water was added dropwise over a period of about 15 minutes while the first solution was stirred vigorously to produce a third solution. The color of the third solution turned slightly more reddish. The third solution then was heated gently to 40° C. and allowed to stand at that temperature for several hours. After standing at room temperature for an additional 24 hours, the THF then was evaporated under vacuum leaving a yellow-brown solid of $(CpTiCl_2)_2O$.

Preparation of the Chlorided, Zinc-containing Alumina:

A commercial alumina sold as Ketjen grade B alumina was obtained from Akzo Nobel Chemical having a pore volume of about 1.78 cc/g and a surface area of about 350 $m^2/g$. A solution of 435 mls of deionized water, 34.65 grams of zinc chloride, and 2.5 mls of nitric acid was made and impregnated onto a 170.35 gram sample of Ketjen Grade B alumina to produce a zinc-containing alumina. Thus, the zinc chloride loading was 20% by weight of the alumina. The zinc-containing alumina then was dried overnight under vacuum at 100° C. and pushed through an 80 mesh screen. A portion of the zinc-containing alumina then was calcined in dry air at 600° C. for three hours to convert the zinc species to a mixed zinc oxide producing a calcined, zinc-containing alumina. Then, the calcined, zinc-containing alumina was activated in 25 gram batches as follows. 25 grams of the calcined, zinc-containing alumina was heated under nitrogen to 600° C. again and while still at 600° C., 2.4 mls of carbon tetrachloride were injected into the gas stream where it evaporated and was carried up through the fluidizing zinc-containing alumina bed to produce a chlorided, zinc-containing alumina. The chlorided, zinc-containing alumina then was stored under dry nitrogen and later tested for polymerization activity.

Bench Scale Polymerization Runs:

Bench scale polymerizations runs were carried out in a one gallon stirred Autoclave Engineers reactor. It was first prepared for use by purging with nitrogen and heating the empty reactor to 120° C. After cooling to below 40° C. and purging with isobutane vapors, a small amount of the organometal compound, usually from 0.001 to 0.01 grams as indicated, was charged to the reactor under nitrogen. Then, an activator, such as a MAO solution, was added, and the reactor was closed. Next, 1-hexene, if used, was injected into the reactor, followed by two liters of isobutane liquid added under pressure to produce a reaction mixture. The reactor was subsequently heated to the desired temperature, usually 90° C., or as otherwise indicated. The reaction mixture was stirred at 700 revolutions per minute (rpm). In some runs, while heating, hydrogen was added to the reactor from one of two auxiliary vessels of 55 cc (SV) or 325 cc (LV) volume. The amount of hydrogen added was measured and expressed by the pressure drop on this vessel as its contents were added the reactor. The final partial pressure of hydrogen on the reactor itself can be determined approximately by multiplying the measured pressure drop from these auxiliary vessels by 0.163 (LV) or by 0.028 (SV). Ethylene then was added to the reactor and fed on demand to maintain a fixed total pressure of 450 psig, or as otherwise indicated. The reactor was maintained at the specified temperature for about 60 minutes. Then, the isobutane and ethylene were vented from the reactor, and the reactor then was opened. The polymer was collected usually as a dry powder. In some cases, the polymer stuck to the reactor walls and had to be scraped off for recovery.

When a halided, metal-containing solid oxide component was used as the activator, typically 0.25 grams of the halided, metal-containing solid oxide component was sealed in a glass tube to which a toluene solution containing from 2 to 20 mg of the organometal compound were added as well as 1 mL of a 1 molar heptane solution of the organoaluminum, usually triethylaluminum, to produce a pre-contacted catalyst mixture. The pre-contacted catalyst mixture then was added to the reactor under nitrogen.

Ethylene was polymerization grade ethylene obtained from Union Carbide Corporation. The ethylene was purified further through a column of ¼ inch beads of Alcoa A201 alumina that had been activated at 250° C. in nitrogen. Isobutane was polymerization grade obtained from Phillips Petroleum Co., Borger, Tex. It was purified further by distillation, and it too was passed through a column of ¼ inch beads of Alcoa A201 alumina that had been activated at 250° C. in nitrogen. The 1-hexene was polymerization grade obtained from Chevron Chemicals. It was purified further by nitrogen purging and storage over 13×molecular sieves that had been activated at 250° C. The methylaluminoxane (MAO) was obtained from Albemarle Corporation as a 10% solution in toluene. Other organoaluminum compounds were obtained from Akzo Corporation as one molar solutions in heptane.

Polymer Tests:

Bulk density was determined in lbs/ft as described in ASTM D1895-89, by weighing a 100 ml graduated cylinder in which polymer fluff had been lightly tapped.

Polymer density was determined in grams per cubic centimeter (g/cc) on a compression molded sample, cooled at about 15° C. per hour and conditioned for about 40 hours at room temperature in accordance with ASTM D1505-68 and ASTM D1928, procedure C.

Melt Index (MI) in grams of polymer per ten minutes was determined in accordance with ASTM D1238, condition 190/2, at 190° C. with a 2,160 gram weight. 190° C.

High load melt index (HLMI, g/10 min) was determined in accordance with ASTM D1238, Condition 190/2.16, at 190° C. with a 21,600 gram weight.

Molecular weights and molecular weight distributions were obtained using a Waters 150 CV gel permeation chromatograph (GPC) with trichlorobenzene (TCB) as the solvent, with a flow rate of 1 mL/minute at a temperature of 140° C. BHT (2,6-di-tert-butyl-4-methylphenol) at a concentration of 1.0 g/L was used as a stabilizer in the TCB. An injection volume of 220 microliters were used with a nominal polymer concentration of 0.3 g/l (at room temperature). Dissolution of the sample in stabilized TCB was carried out by heating at 160–170° C. for 20 hours with occasional, gentle agitation. The column was two Waters HT-6E columns (7.8×300 mm). The columns were calibrated with a broad linear polyethylene standard (Phillips Marlex® polyethylene BHB 5003) for which the molecular weight had been determined.

Branch analysis was accomplished via solution 13C NMR spectra, which were collected from a deuterated trichlorobenzene solution of polymer using either a GEQE200 NMR spectrometer at 75.5 MHZ, or a Varian 500 NMR spectrometer at 125.7 MHZ.

Examples 1–28

A number of bench-scale polymerization runs were made with $(CpTiCl_2)_2O$ and with a number of other related titanium based organometal compounds for comparison. The results of these tests are listed in Table 1.

In these runs, usually 0.25 g of the chlorided, zinc-containing alumina described previously was charged to the reactor along with a few milligrams of the organometal compound, as indicated in the table, and a small amount of the organoaluminum compound, usually 1 mL or 0.5 mL of triisobutyl aluminum. In some cases, these ingredients were combined in a glass tube for a short time before being added to the reactor.

It can be seen from Table 1 that the inventive compound, designated as A in the table, is considerably more active than any other compound that was tested. Comparative compounds included the closest relative to the inventive compound, the cyclopentadienyl titanium dichloride aryloxides, and also the precursor material, cyclopentadienyl titanium trichloride, and even the well-known "constrained geometry" catalyst from Dow. However, none of these compounds approached the activity exhibited from the inventive compound. Notice also that the inventive compound produced extremely high molecular weight polymer, which is desirable for a bimodal combination of catalysts.

TABLE 1

| Example # | Organometal Compound Type | Organometal Compound Mg | Temp. deg C. | Hexene (g) | Triisobutyl-aluminum (ml) | Chlorided, Zinc-Containing Alumina (g) | Polymer Yield (g) | Time (min) | Chlorided, Zinc-Containing Alumina Activity (gPE/g/h)* | Organometal Compound Activity (gPE/g/h)* | HLMI | Density (g/cc) |
|---|---|---|---|---|---|---|---|---|---|---|---|---|
| 1 | A | 6.0 | 80 | 25 | 0.5 | 0.250 | 339 | 30 | 2712 | 113,000 | 0.01 | 0.9289 |
| 2 | A | 6.0 | 80 | 25 | 0.5 | 0.250 | 331 | 30 | 2648 | 110,333 | 0.11 | 0.9280 |
| 3 | A | 6.0 | 80 | 90 | 0.5 | 0.250 | 306 | 30 | 2448 | 102,000 | 0.06 | 0.9244 |
| 4 | B | 17.0 | 80 | 0 | 1 | 0.250 | 0 | 22 | 0 | 0 | | |
| 5 | B | 17.0 | 80 | 0 | 1 | 0.250 | 35 | 51 | 165 | 2,422 | | |
| 6 | C | 18.0 | 80 | 0 | 1 | 0.250 | 0 | 34 | 0 | 0 | | |
| 7 | C | 19.0 | 80 | 0 | 1 | 0.250 | 0 | 46 | 0 | 0 | | |
| 8 | D | 50.0 | 90 | 20 | 1 | 0.250 | 0 | 38 | 0 | 0 | | |
| 9 | E | 23.0 | 90 | 20 | 1 | 0.250 | 43 | 60 | 172 | 1,870 | | |
| 10 | F | 7.0 | 80 | 0 | 1 | 0.150 | 6 | 60 | 40 | 857 | | |
| 11 | F | 12.0 | 70 | 0 | 0.5 | 0.150 | 14 | 60 | 93 | 1,167 | | |
| 12 | G | 10.0 | 80 | 25 | 0.5 | 0.250 | 0 | 30 | 0 | 0 | | |
| 13 | H | 10.0 | 80 | 25 | 0.5 | 0.250 | 89 | 30 | 356 | 8,900 | | |
| 14 | I | 10.0 | 80 | 25 | 0.5 | 0.250 | 5 | 30 | 20 | 500 | | |
| 15 | J | 4.0 | 80 | 25 | 0.5 | 0.250 | 18 | 30 | 144 | 9000 | | |
| 16 | J | 4.0 | 80 | 25 | 0.5 | 0.250 | 20 | 30 | 160 | 10,000 | | |
| 17 | K | 8.0 | 90 | 22 | 1 | 0.250 | 121 | 60 | 484 | 15,125 | | |
| 18 | K | 4.0 | 80 | 50 | 0.5 | 0.250 | 45 | 30 | 360 | 22,500 | 0.05 | 0.9289 |
| 19 | L | 12.0 | 90 | 0 | 1 | 0.250 | 0 | 21 | 0 | 0 | | |
| 20 | L | 5.0 | 90 | 11 | 1 | 0.249 | 40 | 30 | 161 | 8,000 | | |
| 21 | L | 10.0 | 90 | 20 | 1 | 0.250 | 13 | 60 | 52 | 1,300 | | |
| 22 | L | 4.0 | 90 | 41 | 1 | 0.258 | 41 | 30 | 159 | 10,250 | | |
| 23 | M | 20.5 | 80 | 0 | 1 | 0.162 | 38 | 60 | 235 | 1,854 | | |
| 24 | M | 17.4 | 80 | 5 | 1 | 0.158 | 33 | 60 | 209 | 1,897 | | |
| 25 | M | 9.7 | 80 | 10 | 1 | 0.147 | 51 | 60 | 347 | 5,258 | 0 | 0.9309 |

TABLE 1-continued

| Example # | Organometal Compound Type | Organometal Compound Mg | Temp. deg C. | Hexene (g) | Triisobutyl-aluminum (ml) | Chlorided, Zinc-Containing Alumina (g) | Polymer Yield (g) | Time (min) | Chlorided, Zinc-Containing Alumina Activity (gPE/g/h)* | Organometal Compound Activity (gPE/g/h)* | HLMI | Density (g/cc) |
|---|---|---|---|---|---|---|---|---|---|---|---|---|
| 26 | N | 6.0 | 80 | 25 | 0.5 | 0.250 | 90 | 30 | 360 | 15,000 | | |
| 27 | O | 10.0 | 80 | 25 | 0.5 | 0.250 | 0 | 30 | 0 | 0 | | |
| 28 | P | 10.0 | 80 | 25 | 0.5 | 0.500 | 16 | 60 | 32 | 1600 | | |

Code for Table 1

A is the inventive compound $(CpTiCl_2)_2O$ where Cp=cyclopentadienyl.

B is cyclopentadienyl titanium trichloride, or $CpTiCl_3$.

C is pentamethylcyclopentadienyl titanium trichloride, or $(CH_3)CpTiCl_3$.

D is pentamethylcyclopentadienyl titanium trimethoxide, or $(CH_3)CpTi(OCH_3)_3$ E is indenyl titanium trichloride, or $IndTiCl_3$.

F is bis-cyclopentadienyl titanium dichloride, or $Cp_2TiCl_2$.

G is 1-methylindenyl titanium trichloride, or $CH_3IndTiCl_3$.

H is 1,2,3-trimethylindenyl titanium trichloride, or $(CH_3)_3IndTiCl_3$.

I is 1-phenylindenyl titanium trichloride, or $C_6H_5IndTiCl_3$.

J is cyclopentadienyl titanium dichloride 2,5 di-t-butylphenoxide.

K is cyclopentadienyl titanium dichloride 2,5 dimethylphenoxide.

L is pentamethylcyclopentadienyl titanium dichloride 2,5 diisopropylphenoxide.

M is (t-butyl amido)(tetramethylcyclopentadienyl) dimethylsilane titanium dichloride, a constrained geometry catalyst of Dow Chemical Company.

N is the cyclic tetramer $(CpTiClO)_4$.

O is cyclopentadienyl titanium dichloride (p-ethoxyphenoxide).

P is cyclopentadienyl titanium dichloride (p-methylphenoxide).

Chlorided Zinc-Containing Alumina Activity=grams of polyethylene per gram of chlorided, zinc-containing alumina per hour Organometal Compound Activity=grams of polyethylene per gram of organometal compound per hour Examples 29–32

Bench scale polymerization runs were made at 80° C. with the inventive organometal compound A described previously and the chlorided, zinc-containing alumina. In each run, 1 mL of 1 molar triisobutylaluminum was added along with a varying amount of hexene. The polymers produced had a HLMI of zero. C-13 NMR branching analysis was performed on the polymers, and the following data in Table 2 were observed.

TABLE 2

| Example No. | Grams Hexene Added | Density (g/cc) | Ethyl Branches Wt % | Butyl Branches Wt % |
|---|---|---|---|---|
| 29 - Inventive | 10 | 0.9319 | 0.12 | 1.62 |
| 30 - Inventive | 20 | 0.9300 | 0.10 | 3.18 |
| 31 - Inventive | 30 | 0.9280 | 0.10 | 4.62 |
| 32 - Comparative | 100 | 0.9401 | 0 | 1.02 |

Butyl branching increased, as expected, with increased hexene. The remarkable feature, however, is how much branching is incorporated with so little hexene added. This represents a high degree of comonomer incorporation efficiency. NMR detected ethyl branching as well, which indicates in-situ butene generation. In Comparison Example 32, bis(n-butylcyclopentadienyl)zirconium dichloride, well known for its high activity and for its ability to produce low molecular weight polymer, incorporated little hexene in comparison to the inventive compound A.

Thus, the first organometal compound and first catalyst composition of this invention: 1) displays high activity; 2) incorporates hexene well, and 3) also produces extremely high molecular weight polymer. This is a unique combination of characteristics that is ideal for producing bimodal polymers from a combination of organometal compounds with branching concentrated in the high molecular weight part of the distribution. The comparative compound in Table 2, bis(n-butylcyclopentadienyl)zirconium dichloride, makes an ideal companion to the inventive first catalyst composition because of its high activity, yet poor incorporation efficiency, and its natural ability to produce low molecular weight polymer. The two together form an excellent choice for producing bimodal polymers.

Example 33
Bimodal Production Runs in Loop Reactor

Ethylene polymers were prepared also in a continuous particle form process (also known as a slurry process) by contacting a second catalyst composition with ethylene and hexene comonomer. The medium and temperature are thus selected such that the copolymer is produced as solid particles and is recovered in that form. Ethylene that had been dried over activated alumina was used as the monomer. Isobutane that had been degassed by fractionation and dried over alumina was used as the diluent.

A liquid full 15.2 cm diameter pipe loop reactor having a volume of 23 gallons (87 liters) was utilized. Liquid isobutane was used as the diluent, and occasionally some hydrogen was added to regulate the molecular weight of the polymer product. The reactor pressure was about 4 Mpa (about 580 psi). The reactor temperature was set at 180° F. The reactor was operated to have a residence time of 1.25 hours. The second catalyst composition was added through a 0.35 cc circulating ball-check feeder. At steady state conditions, the isobutane feed rate was about 46 liters per hour, the ethylene feed rate was about 30 lbs/hr, and the 1-hexene feed rate was varied to control the density of the polymer product. Ethylene concentration in the diluent was 14 mole percent. Catalyst concentrations in the reactor was such that the second catalyst composition content ranges from 0.001 to about 1 weight percent based on the weight of the reactor contents. Polymer was removed from the reactor at the rate of about 25 lbs per hour and recovered in a flash chamber. A Vulcan dryer was used to dry the polymer under nitrogen at about 60–80° C.

The organoaluminum compound, triisobutylaluminum (TIBA), was obtained from Akzo Corporation and was added as indicated in a concentration of about 1 to 250 parts per million by weight of the diluent. To prevent static buildup in the reactor, a small amount (<5 ppm of diluent) of a commercial antistatic agent sold as Stadis® 450 usually was added.

Ethylene was polymerization grade ethylene obtained from Union Carbide Corporation. This ethylene was purified further through a column of ¼ inch beads of Alcoa A201 alumina which had been activated at 250° C. in nitrogen. Isobutane was polymerization grade obtained from Phillips Petroleum Co., Borger, Tex. It was purified further by distillation and it too was passed through a column of ¼ inch beads of Alcoa A201 alumina that had been activated at 250° C. in nitrogen. The 1-hexene was polymerization grade obtained from Chevron Chemicals. It was purified further by nitrogen purging and storage over 13×molecular sieves that had been activated at 250° C.

Several bimodal polymers then were made in the continuous loop reactor by co-feeding two organometal compounds simultaneously. The same chlorided, zinc-containing alumina as described previously was used as the activator, along with 250 ppm by weight of triisobutyl aluminum. Hexene was pumped into the reactor at the rate of 12.5 lbs per hour. The hexene to ethylene feed weight ratio was 0.33. Reactor temperature was 180° F. Density of the polymer was maintained at 0.920 g/cc, and the bulk density was about 22 lbs/cubic foot. The two organometal compounds used were the inventive compound described previously, $(CpTiCl_2)_2O$, which produces the high molecular weight copolymer, and bis(n-butylcyclopentadienyl)zirconium dichloride also described previously in Table 2, which produces the low molecular weight less branched polymer.

The relative amounts of the two organometal compounds were varied to produce five different polymers of varying breadth of molecular weight distribution. The GPC traces of the five polymers are shown in FIG. 1. Notice that as the inventive compound, $(CpTiCl_2)_2O$, is increased in amount relative to the bis(n-butylcyclopentadienyl)zirconium dichloride, the polymer molecular weight distribution broadens. The polydispersity (weight average molecular weight divided by number average molecular weight) produced by the $(CpTiCl_2)_2O$ alone was about 9, while the polydispersity of the bis(n-butylcyclopentadienyl)zirconium dichloride alone was about 2.3. However, by combining the two organometal compounds, polydispersities of 12–17 was obtained, signifying greater breadth of molecular weight distribution.

While this invention has been described in detail for the purpose of illustration, it is not intended to be limited thereby but is intended to cover all changes and modifications within the spirit and scope thereof.

That which is claimed is:

1. A process to produce a first catalyst composition, said process comprising contacting at least one first organometal compound and at least one activator;

wherein said first organometal compound is represented by the formula:

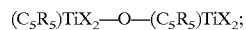

wherein said R is the same or different and is independently selected from the group consisting of hydrogen and a hydrocarbyl group having from 1 to about 10 carbon atoms;

wherein said hydrocarbyl group is selected from the group consisting of a linear or branched alkyl, a substituted or unsubstituted aryl, and an alkylaryl; and wherein X is the same or different and is independently selected from the group consisting of a halide, an alkyl, or alkylaryl having from 1 to about 10 carbon atoms, and a triflate; and wherein said activator is selected from the group consisting of aluminoxanes, fluoro-organic borate compounds, and treated solid oxide components in combination with at least one organoaluminum compound.

2. A process according to claim 1 wherein said first organometal compound is selected from the group consisting of $[(C_5H_4CH_3)TiCl_2]_2O$, $[(C_5H_4CH_2C_6H_5)TiF_2]_2O$, $[(C_5H_3CH_3C_2H_5)TiBr_2]O$, and $[(C_5H_5)TiCl_2]_2O$.

3. A process according to claim 2, wherein said first organometal compound is $[(C_5H_5)TiCl_2]_2O$.

* * * * *